(12) United States Patent
Cheng et al.

(10) Patent No.: US 9,226,309 B2
(45) Date of Patent: Dec. 29, 2015

(54) METHOD AND SYSTEM FOR UPLINK JOINT SCHEDULING

(71) Applicant: Huawei Technologies Co., Ltd., Shenzhen (CN)

(72) Inventors: Ho-Ting Cheng, Stittsville (CA); Hang Zhang, Nepean (CA); Ngoc-Dung Dao, Ottawa (CA); Aaron Callard, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 515 days.

(21) Appl. No.: 13/650,793

(22) Filed: Oct. 12, 2012

(65) Prior Publication Data

US 2014/0106802 A1 Apr. 17, 2014

(51) Int. Cl.
*H04B 7/00* (2006.01)
*H04B 15/00* (2006.01)
*H04W 72/00* (2009.01)
*H04W 72/12* (2009.01)

(52) U.S. Cl.
CPC .................................. *H04W 72/12* (2013.01)

(58) Field of Classification Search
CPC ...................................................... H04W 72/12
USPC ............................ 455/507, 509, 450.1, 452.1
See application file for complete search history.

(56) References Cited

U.S. PATENT DOCUMENTS

| | | | |
|---|---|---|---|
| 8,472,963 B2* | 6/2013 | Caire | 455/446 |
| 8,498,647 B2* | 7/2013 | Gorokhov et al. | 455/446 |
| 8,509,831 B2* | 8/2013 | Acharya et al. | 455/507 |
| 8,675,511 B2* | 3/2014 | Gorokhov et al. | 370/252 |
| 2010/0041407 A1* | 2/2010 | Caire et al. | 455/446 |
| 2010/0056215 A1* | 3/2010 | Gorokhov et al. | 455/561 |
| 2013/0155970 A1* | 6/2013 | Tulino | 370/329 |

* cited by examiner

*Primary Examiner* — Tilahun B Gesesse
(74) *Attorney, Agent, or Firm* — Slater & Matsil, L.L.P.

(57) ABSTRACT

An embodiment method for performing joint scheduling in a cluster of base stations (BSs) of a wireless network includes receiving coarse scheduling information pertaining to external BSs and performing joint scheduling for the instant cluster of BSs such that a sum utility is maximized. The sum utility includes an out-of-cluster utility component representing interference observed by the external BSs as a result of the joint scheduling. The out-of-cluster utility component is computed in accordance with the coarse scheduling information.

24 Claims, 10 Drawing Sheets

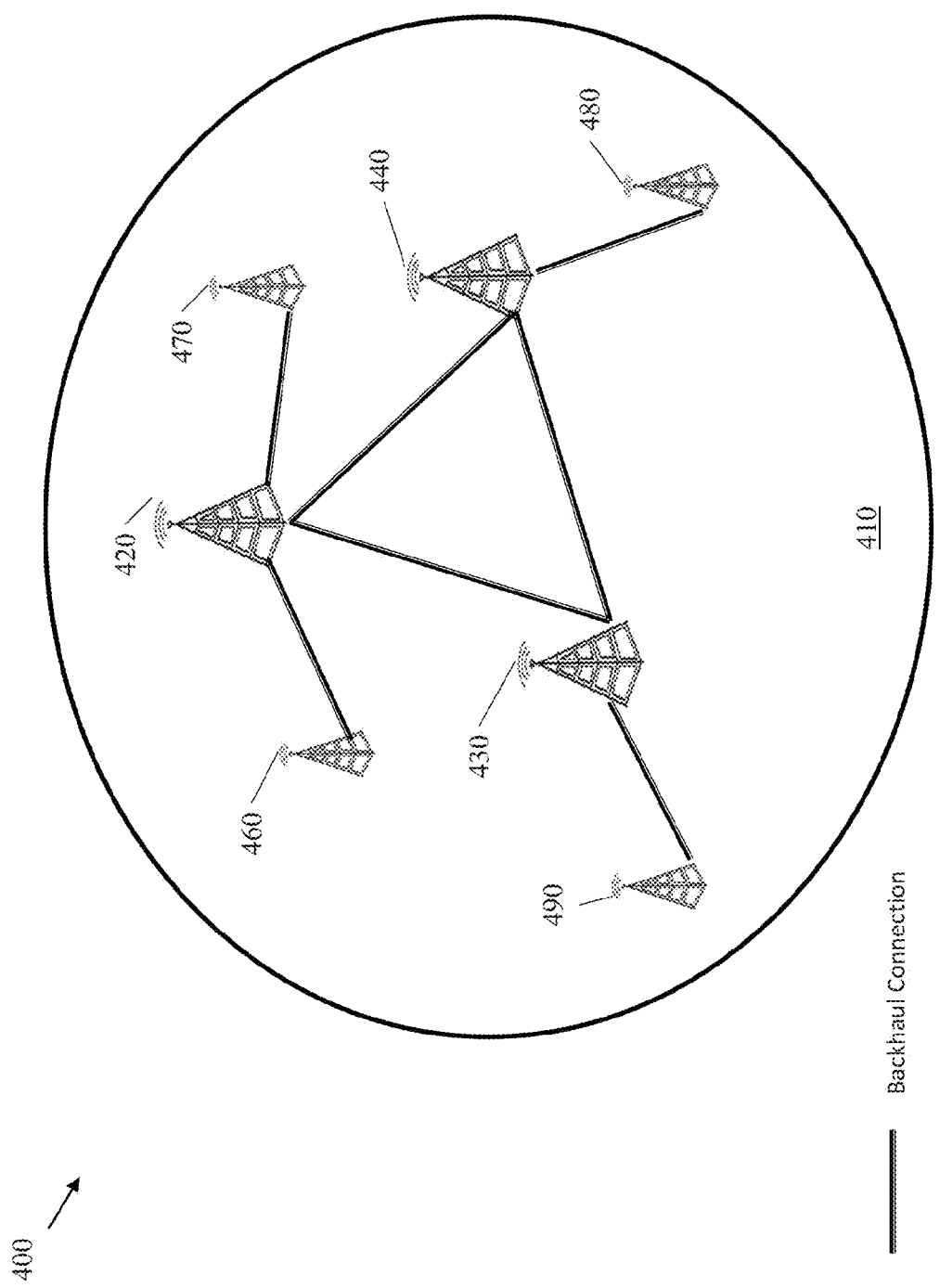

METHOD AND SYSTEM FOR UPLINK JOINT SCHEDULING

TECHNICAL FIELD

The present invention relates generally to wireless networks and methods, and in particular, a method and system for achieving improved uplink joint scheduling in wireless networks.

BACKGROUND

Joint scheduling allows for improved throughput and coverage in wireless networks by coordinating (to one degree or another) the scheduling decisions of neighboring base stations (BSs). Specifically, BSs participating in joint scheduling may make user equipment (UE) scheduling decisions and/or modulation coding scheme (MCS) assignments that mitigate Inter-Cell-Interference (ICI) in neighboring cells based on scheduling information communicated by neighboring BSs. For instance, neighboring BSs may coordinate their scheduling so as to avoid scheduling respective cell edge UEs (CEUs) and/or assigning similar MCSs to the same time-frequency resource, thereby smoothing out interference over thermal noise levels (IoTs) through improved link adaptation and more accurate channel quality indicator (CQI) predication. Joint scheduling is particularly advantageous for managing ICI in the uplink communications channel, where IoTs tend to vary to greater degrees due to the persistent shifting of transmission points from resource block (RB) to RB. That is to say, scheduled UEs are distributed throughout the cell, which causes the effective uplink transmission point to migrate between successive RBs.

Conventional joint scheduling techniques generally involve a negotiation between neighboring BSs for purposes of reaching a coordinated scheduling agreement, and typically includes computation of the scheduling agreement using (for instance) an exhaustive search approach. However, the negotiation/computation required by conventional joint scheduling may consume substantial network resources, particularly in large networks. To reduce the network resources consumed by joint scheduling, BSs within a network may be sub-divided into two or more clusters of BSs, with separate joint scheduling (e.g., intra-cluster joint scheduling) being performed by the member BSs of each cluster. This clustering technique reduces the complexity of the scheduling/negotiation by reducing the number of BSs participating in a given instance of joint scheduling. Even with clustering, however, the negotiation/computation required by conventional joint scheduling may consume substantial amounts of network resources (e.g., backhaul bandwidth, computation capacity, etc.). As such, techniques extending beyond the basic clustering of BSs are desired for reducing network costs associated with joint scheduling.

Furthermore, conventional intra-cluster joint scheduling only considers ICI consequences for member BSs of the instant cluster, and consequently does not mitigate ICI levels observed by base stations in external clusters. As such, mechanisms and techniques for reducing inter-cluster interference are desired in an effort to further mitigate overall ICI levels experienced in the network.

SUMMARY OF THE INVENTION

Technical advantages are generally achieved by preferred embodiments of the present invention which describe methods and systems for uplink joint scheduling.

In accordance with an embodiment, a method is provided for performing joint scheduling in a cluster of BSs of a wireless network. The method includes receiving coarse scheduling information pertaining to external BSs, and performing joint scheduling for the internal BSs included within the instant cluster of BSs such that a sum utility is maximized. In this example, the sum utility includes an out-of-cluster utility component representing estimated interference to be observed by the external BSs as a result of the joint scheduling. The out-of-cluster utility component is computed in accordance with the coarse scheduling information.

In accordance with another embodiment, a network component is provided for performing scheduling to optimize a sum utility. In this example, the sum-utility includes an out-of-cluster cluster utility component that is computed in accordance with coarse scheduling information received from a plurality of external BSs.

In accordance with yet another embodiment, a BS is provided for performing joint scheduling to maximize a sum-utility that includes sub-components corresponding to loosely coordinated and tightly coordinated neighboring BSs. In this example, the sum-utility includes a first sub-component corresponding to a tightly coordinated neighboring BS and that is computed according to the UE scheduling and MCS assignments of the tightly coordinated neighboring BS. The sum-utility further includes a second sub-component corresponding to a loosely coordinated neighboring BS and that is approximated without any knowledge of UE scheduling and MCS assignments mad by the loosely coordinated neighboring BS.

In accordance with yet another embodiment, a pico base station (pico-BS) is provided for performing coordinated scheduling in a heterogeneous network (Het-Net). In this example, the pico-BS is configured to schedule a first UE to perform an uplink transmission in a RB using a first MCS, and communicate localized scheduling information describing the localized scheduling to a macro base station (macro-BS) in the HetNet, thereby triggering the macro-BS to engage in joint scheduling with neighboring macro-BSs in the HetNet. Thereafter, the pico-BS is configured to receive joint scheduling information from the macro-BS, and update the localized scheduling in accordance with the joint scheduling information. Updating the localized scheduling may include re-assigning a second MCS to the RB without rescheduling the first UE.

In accordance with yet another embodiment, a macro-BS is provided for performing coordinated scheduling in a Het-Net. In this example, the macro-BS is configured to receive scheduling information specifying that a first pico-BS has scheduled a first UE to perform an uplink transmission in a RB using a first MCS. Thereafter, the macro-BS is configured to perform joint scheduling with neighboring macro-BSs under the assumption that a first pico-BS has scheduled a first UE to perform an uplink transmission in the RB using the first MCS. Subsequently, the macro-BS is configured to communicate scheduling information describing the joint scheduling to the first pico-BS, thereby causing the first pico-BS to re-assign a second MCS to the RB without rescheduling the first UE.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a wireless network architecture comprising a cluster of BSs having varying degrees of coordination;

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Some aspects of this disclosure describe an iterative approach to joint scheduling that reduces complexity when compared to conventional joint scheduling. Specifically, BSs within a cluster may sequentially perform local scheduling to maximize a sum utility, thereby eliminating much of the signaling overhead and computational steps associated with conventional joint scheduling. Other aspects of this disclosure describe a sum-utility computation that includes an out-of-cluster utility component (in addition to an in-cluster utility component), which allows devices to perform intra-cluster joint scheduling that mitigates ICI levels observed by external BSs. Yet other aspects of this disclosure describe a sum-utility computation that includes loosely and tightly coordinated in-cluster utility sub-components, which allows for more accurate joint scheduling in various networks (e.g., heterogeneous networks (HetNets), etc.). Other useful aspects of this disclosure are described below.

Figure 1:
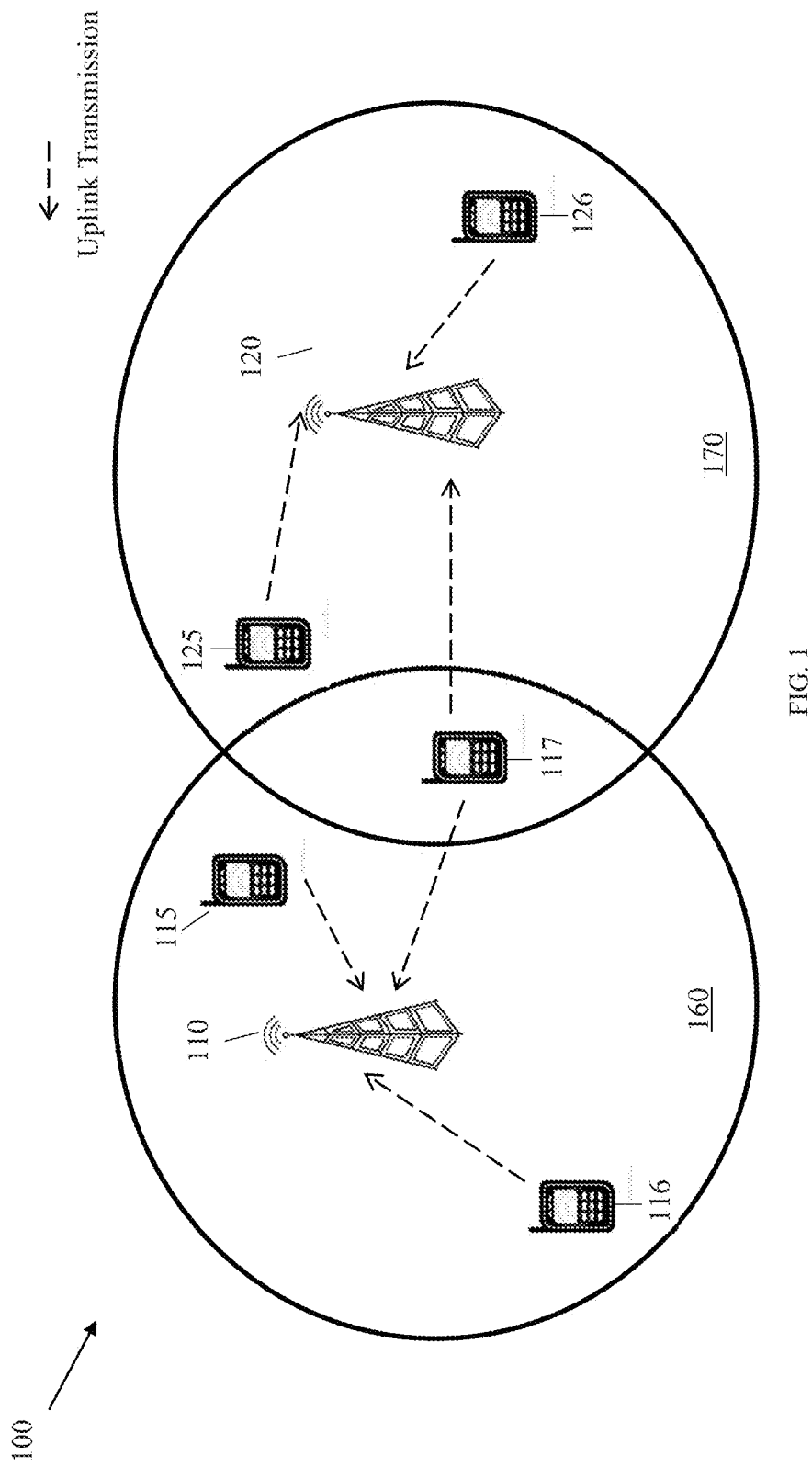
FIG. 1 illustrates a wireless network architecture.

FIG. 1 illustrates a wireless network 100 comprising a first BS 110, a first plurality of UEs 115-117, a second BS 120, and a second plurality of UEs 125-126. The BS 110 may serve the UEs 115-117 in the coverage area 160, while the BS 120 may serve the UEs 117, 125-126 in the coverage area 170. In some embodiments, the coverage areas 160 and 170 may intersect to form an overlap region, within which one or more UEs (e.g., the UE 117) may reside. Uplink transmissions (dashed arrows) from the UEs 115-117 and 125-126 may produce interference in the network 100. For instance, uplink transmissions from the UEs 115-117 may interfere with one another, as well as with uplink transmissions from the UEs 125-126. In some instances, the BSs 110 and 120 may perform joint scheduling to mitigate ICI levels in the network 100. For instance, the BSs 110 and 120 may coordinate their UE scheduling decisions such that their respective CEUs are not scheduled to the same time-frequency resource. Further, the BSs 110 and 120 may coordinate their scheduling decisions so that appropriate MCSs are used in data transmission for common time-frequency resources. In some embodiments, the BSs 110 and 120 may implement coordinated multipoint (Comp) reception techniques to improve the data transmission rates for one or more UEs (e.g., the UE 117) in the overlapped region of their respective coverage areas.

Figure 2:
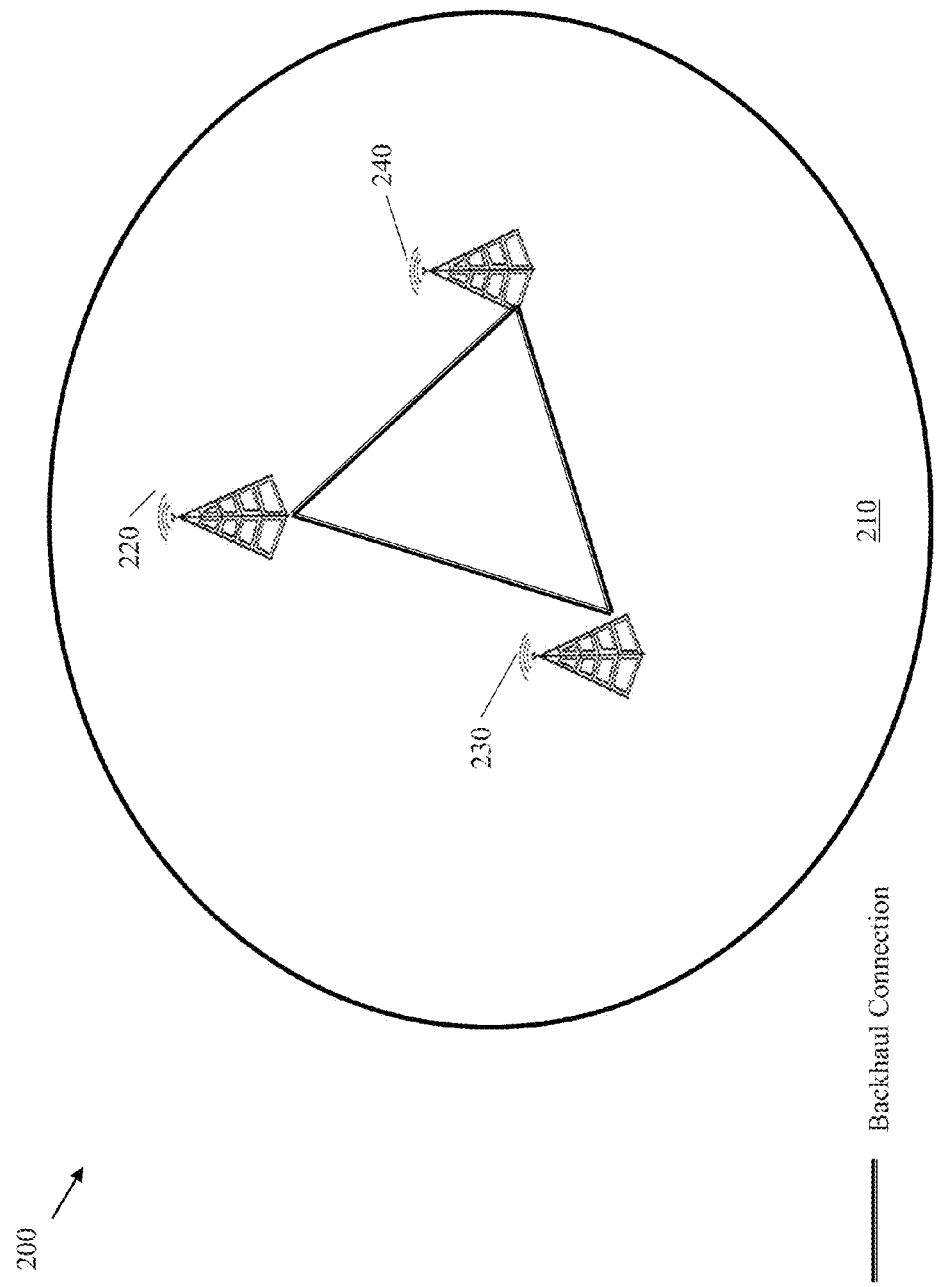
FIG. 2 illustrates a wireless network architecture comprising a cluster of BSs.

As more BSs are added to a network, it may be beneficial to cluster BSs to reduce the complexity of joint scheduling. FIG. 2 illustrates a network 200 comprising a cluster of BSs 210. The cluster of BSs 210 includes a plurality of BSs 220-240, which may be interconnected via a backhaul connection (e.g., a wire-line connection). Although implicitly present, UEs are not depicted within the network 200 for purposes of clarity and concision. The complexity and/or overhead associated with joint scheduling within the cluster 210 may be depend on various characteristics, such as the type of joint scheduling techniques applied, the number of BSs/UEs within the cluster 210, etc. In some situations, the computational and/or network load required to perform conventional joint scheduling in the cluster 210 may exceed available network resources within the cluster 210. For instance, the capacity of the backhaul connection may be insufficient to support the requisite negotiation associated with conventional joint scheduling, or the computational capacity of one or more of the BSs 220-240 may be insufficient to execute an exhaustive search.

Figure 3:
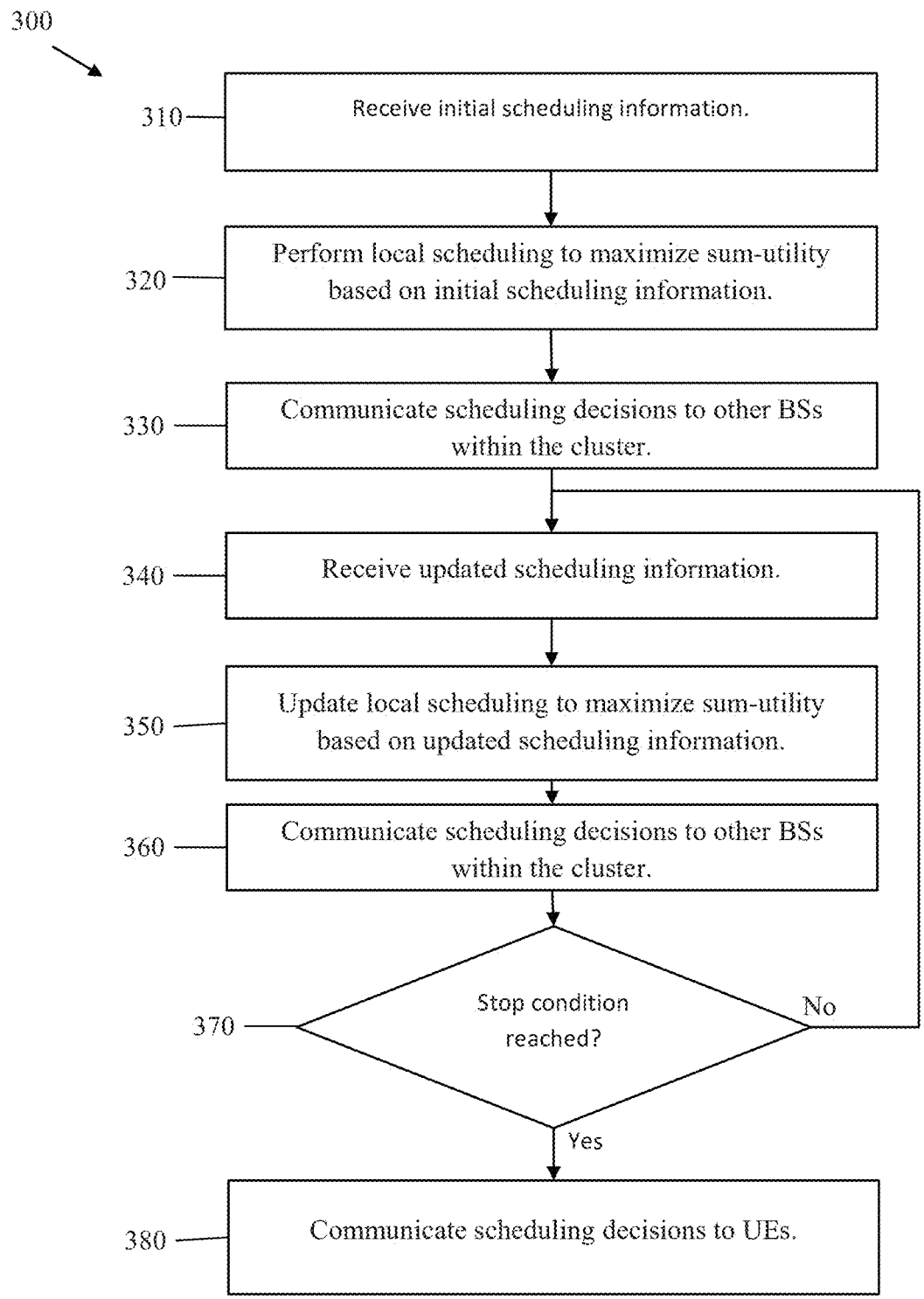
FIG. 3 illustrates an embodiment of a method of sequential joint scheduling for a cluster of BSs.

One solution for reducing complexity and/or conserving resources is to use an iterative/sequential approach to joint scheduling. FIG. 3 illustrates an embodiment of a method 300 for sequential joint scheduling, which may be a less complex alternative to conventional joint scheduling. The method 300 begins at step 310, where an instant BS may receive initial scheduling information from one or more neighboring BSs. Notably, characteristics of this scheduling information may depend on the degree of coordination (e.g., loose, tight, or otherwise) between BSs within the cluster, as well as the order in which BSs within the cluster perform the iterative/sequential scheduling. For instance, some scheduling information (e.g., UE/MCS assignments) may not be available for neighboring BSs that have yet to perform their portion of the sequential joint scheduling. Subsequently, the method 300 may proceed to step 320, where the instant BS may perform local scheduling (e.g., schedule UE and assign MCS to a RB) to maximize a sum-utility. The sum utility (which is discussed in greater detail below) may include an in-cluster utility component that computes/estimates the impact with which a given scheduling decision will have upon other BSs within the cluster. Next, the method 300 may proceed to step 330, where the instant BS may communicate the scheduling decisions to other BSs within the cluster. Thereafter, the method 300 may proceed to step 340, where the instant BS may receive updated scheduling information from other BSs within the cluster. The method may then proceed to step 350, where the instant BS may update local scheduling to maximize the sum-utility based on the updated scheduling information. Notably, the sum utility may be adaptive in that it incorporates the updated scheduling information. Subsequently, the method 300 may proceed to step 360, where the instant BS may (once again) communicate the scheduling decisions to other BSs within the cluster. Thereafter, the method may proceed to step 370, where the instant BS may determine whether a stop condition has been reached. If a stop condition has not been reached, the steps 340-360 may be repeated. If a stop condition has been reached, then the method 300 may proceed to step 380, where the scheduling decisions are communicated to the UEs.

When using an iterative approach to joint scheduling, BSs within a cluster may sequentially update their UE and/or MCS assignments based on updated scheduling information that reflects the updated scheduling decisions of other BSs within the cluster. An example of the manner in which scheduling decisions during sequential joint scheduling is illustrated below in Table 1.

TABLE 1

| Iteration (stage) | BS 220 | BS 230 | BS 240 |
|---|---|---|---|
| 1(1) | $UE_1(MCS_2)$ | $UE_2(MCS_2)$ | $UE_5(MCS_3)$ |
| 1(2) | $UE_1(MCS_2)$ | $UE_3(MCS_4)$ | $UE_5(MCS_3)$ |
| 1(3) | $UE_1(MCS_2)$ | $UE_3(MCS_4)$ | $UE_6(MCS_3)$ |
| 2(1) | $UE_1(MCS_3)$ | $UE_3(MCS_4)$ | $UE_6(MCS_3)$ |
| 2(2) | $UE_1(MCS_3)$ | $UE_4(MCS_5)$ | $UE_6(MCS_3)$ |
| 2(3) | $UE_1(MCS_3)$ | $UE_4(MCS_5)$ | $UE_6(MCS_3)$ |
| ... | ... | ... | ... |

As shown in Table 1, the BSs 220-240 update their scheduled UEs (e.g., $UE_i$) and assignment MCSs (e.g., $MCS_i$) based on each other's scheduling decisions. For instant at stage two of the first iteration, e.g., 1(2), the BS 230 updates its scheduling from $UE_2(MCS_2)$ to $UE_3(MCS_4)$, thereby changing the UE and MCS scheduled/assigned to the given RB. To determine which scheduling decisions (e.g., UE/MCS) maximize sum utility, an instant BS may generate a sum utility matrix. An exemplary sum utility matrix is illustrated below in Table 2.

TABLE 2

| | RB | | | | |
|---|---|---|---|---|---|
| UE | $RB_1$ | ... | $RB_j$ | ... | $RB_n$ |
| $UE_1$ | $U_{sum}(1, 1)$ | ... | $U_{sum}(1, j)$ | ... | $U_{sum}(1, n)$ |
| ... | ... | ... | ... | ... | ... |
| $UE_i$ | $U_{sum}(i, 1)$ | ... | $U_{sum}(i, j)$ | ... | |
| ... | ... | ... | ... | ... | ... |
| $UE_m$ | $U_{sum}(m, 1)$ | ... | $U_{sum}(m, j)$ | ... | $U_{sum}(m, n)$ |

As shown, the UEs to be scheduled (e.g., $UE_1, UE_2, \ldots, UE_m$) are designated by rows, the RBs to be scheduled (e.g., $RB_1, RB_2, \ldots, RB_n$) are designated by columns, and the sum utility of a given $UE_i$-$RB_j$ combination ($U_{sum}(i,j)$) is designated in the cross-section.

The formulas used to calculate sum-utility may vary depending on what components are included in the sum utility computation. Specifically, the sum utility may have an in-cluster utility component ($U_{in}$) and (optionally) an out-of-cluster utility component ($U_{out}$) (e.g., $U_{sum}=U_{in}+U_{out}$). The in-cluster utility component corresponds to an amount of interference that is estimated or projected to be observed by BSs within the instant cluster as a result of a given scheduling decision, while the out-of-cluster utility component (discussed in greater detail below) corresponds to an amount of interference that is estimated or projected to be observed by external BSs (i.e., BS not included within the instant cluster) as a result of a given scheduling decision.

When sum-utility includes an in-cluster utility component, the in-cluster utility component can be computed as follows: If a given user (e.g., $UE_i$) is scheduled at a given resource block ($RB_j$) by an instant BS, then the in-cluster utility component is computed by that instant BS in accordance with the following formula:

$$U_{in\text{-}cluster}=U_i(v_i,v_{-i})+\Sigma_{j\neq i}U_j(v_i,v_{-i}),$$

where $v_i$ is the UE candidate to be scheduled by an instant BS (e.g., BSi), $v_{-i}$ is a vector for the UEs selected by all other BSs in the cluster, $U_i(v_i,v_{-i})$ is the utility recognized by the instant BS, and $\Sigma_{j\neq i}U_j(v_i,v_{-i})$ is the total utility recognized by all other BSs in the cluster.

Hence, an instant BS (e.g., BSi) may identify which scheduling decisions maximize the in-cluster utility component according to the following argument:

$$i^*=\arg_i\max\{U_i(v_i,v_{-i})+\Sigma_{j\neq i}U_j(v_i,v_{-i})\}$$

The above algorithm may require knowledge of the scheduling information of all the other internal BSs included within the instant cluster in order to compute the total utility recognized by all other BSs ($\Sigma_{j\neq i}U_j(v_i,v_{-i})$). However, this information is not always available. For instance, certain scheduling information (UE/MCS assignments) may not be available for BSs which have yet to perform sequential scheduling (e.g., such as is the case for BSs 230/240 in iteration(stage) 1(1) in table 1). Additionally, scheduling information may not be available when said information is not communicated in an attempt to decrease signaling overhead.

Accordingly, an instant BS may estimate/approximate the total utility recognized by one or more of the other BSs ($\Sigma_{j\neq i}U_j(v_i,v_{-i})$) using the following formula:

$$\sum U_j(v_i, v_{-i}) \approx w_i \log_2\left(1 + \frac{s}{1 + w_2 * I}\right),$$

where I is the amount of interference generated by a given user corresponding to a vector ($v_i$), s, $w_1$ and $w_2$ are fitted to approximate the average utility of the system.

Notably, the above formula is exemplary, as the utility functions could be represented by any number of functions, including (but not limited to) lookup tables, polynomials, splines, etc. The utility function may (or may not) be modified to compensate for coordinated multipoint (CoMP) scheduling. In some embodiments, the utility function may be updated semi-statically or dynamically, with the frequency in which the utility function is updated/determined in accordance with one or more of a plurality of variables (e.g., individual RB, transmission time interval (TTI) index, scheduling decisions by other BSs, etc.). The frequency in which the utility function is updated may also depend on whether there will be an opportunity to reschedule a UE's MCS. For instance, if the MCS of the scheduled UE is fixed, then reducing the interference below a threshold may have a less significant impact. On the other hand, if the UE's MCS can be changed prior to scheduling, then reducing the interference below a threshold may have a more significant impact. If an MCS for a given user is fixed, the utility (Ui) may by computed using the following formula:

$$U_i = \max\left(w_i\log_2\left(1 + \frac{s}{1 + w_2 * I}\right), c_{mcs}\right),$$

where $c_{mcs}$ is the spectral efficiency of the scheduled MCS.

Notably, the above formula is exemplary, as the effect could be modeled as a change in parameters. In an embodiment, the utility for some BSs may be approximated, while the utility for other BSs may be computed based on scheduling decisions (e.g., UE/MCS assignments) communicated by those BSs. In other embodiments, the utility approximation may be used for all BSs within a cluster. Different portions of the utility approximation may be updated at different rates.

In some networks, BSs within the same cluster may have varying degrees of coordination with one another. These degrees of coordination may depend on, for instance, an instant BSs capability to communicate with other BSs in the cluster, which may be affected by various factors, such as the number and/or quality of backhaul connections that link an instant BS to other BSs within the network. Generally speaking, sub-clusters of BSs within a common cluster that are unable to communicate in an efficient manner (e.g., without any connection or connected with a low-speed/low-capacity link) with one another are considered to be loosely coordinated, while sub-clusters of BSs within a common cluster that are able to communicate in an efficient manner (e.g., connected with a high-speed high capacity link) with one another are considered tightly coordinated. For instance, in HetNet, macro BSs may be tightly coordinated with one another, while pico BSs may be loosely coordinated with one another.

FIG. 4 illustrates a network 400 comprising a cluster of BSs 410 that includes tightly coordinated BSs 420-440 and loosely coordinated BSs 460-490. As shown, the tightly coordinated BSs 420-440 are interconnected directly with other tightly coordinated BSs 420-440, while the loosely coordinated BSs 460-490 are not interconnected with other loosely coordinated BSs 460-490. Consequently, loosely coordinated BSs 460-490 may have difficulty engaging in direct negotiation with one another in an efficient manner. In some embodiments, the loosely coordinated BSs 460-490 are pico-BSs, while the tightly coordinated BSs 420-440 are macro-BSs. In some embodiments, the loosely coordinated BSs 460-490 may be connected to the tightly coordinated BSs 420-440 via lower quality connections than those used to inter-connect the tightly coordinated BSs. In any event, the loosely coordinated BSs 460-490 may be unable to efficiently participate in negotiated joint scheduling with one another. The conventional approach to scheduling in the network 400 may be to simply perform coordinated scheduling amongst the tightly coordinated BSs 420-440 without including the loosely coordinated BSs 460-490. Hence, under the conventional approach, JS scheduling amongst the tightly coordinated BSs 420-440 generally showed little or no deference to scheduling decisions made by the loosely coordinated BSs 460-490, while scheduling decisions made by the loosely coordinated BSs 460-490 were performed independently with little or no coordination with other BSs (loosely coordinated, or otherwise). Consequently, the aforementioned conventional approach often provides a poor mechanism for mitigating ICI in Het-Nets, particularly those deploying substantial numbers of pico-BSs. As such, techniques and mechanisms allow the loosely coordinated BSs 460-490 to participate at least some extent.

Figure 5A:
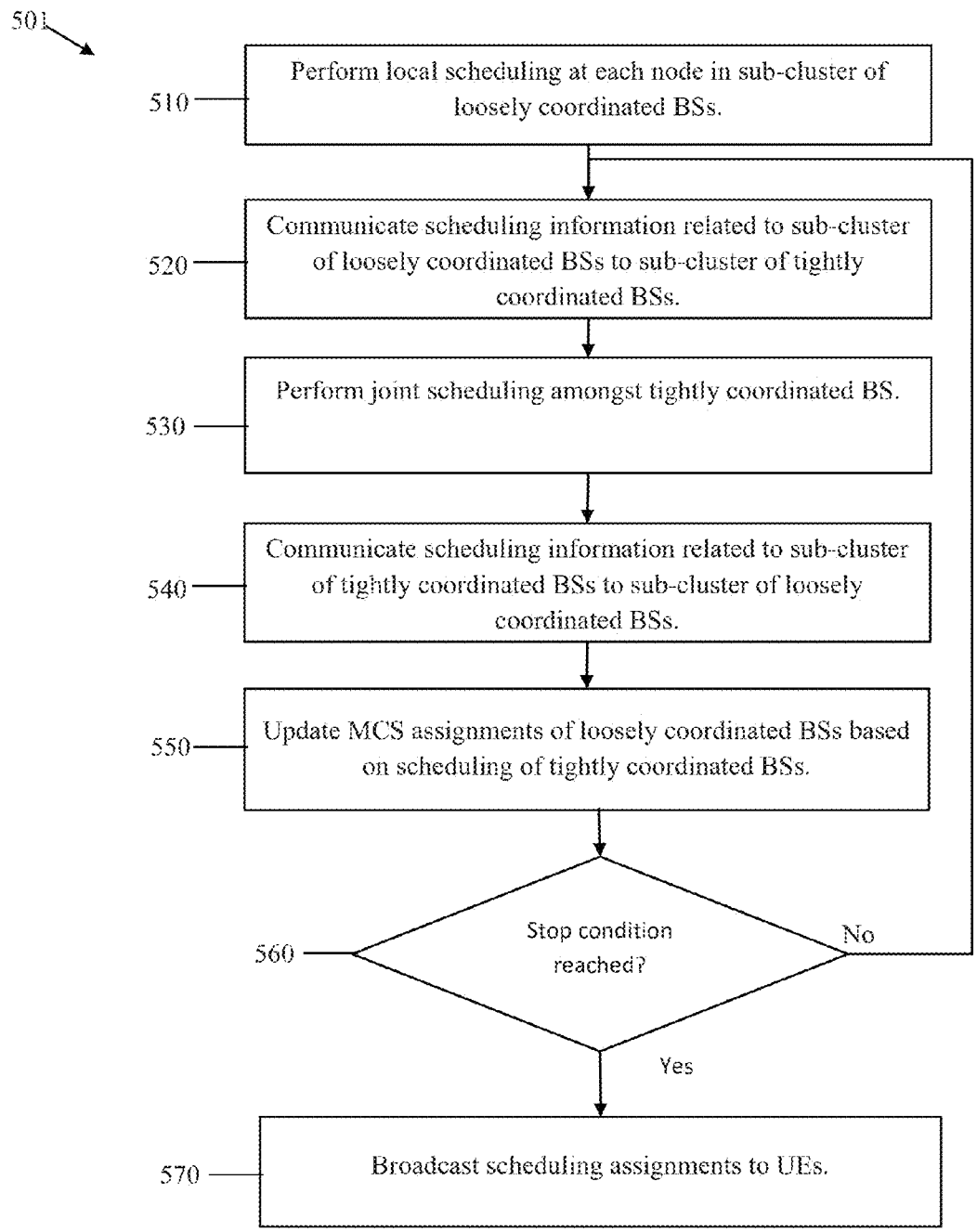
FIG. 5(a) illustrates an embodiment of a method for coordinated scheduling in a cluster of BSs having varying degrees of coordination.

FIG. 5(a) illustrates an embodiment of a method 501 for performing coordinated scheduling in a cluster that includes tightly coordinated BSs and loosely coordinated BSs. The method 501 begins at step 510, where the each BS in the sub-cluster of loosely coordinated BSs may perform local scheduling. This scheduling may be performed with respect to utility functions that approximate the utilities of other BSs in the cluster/network (e.g., macro, pico, or otherwise). Next, the method 501 may then proceed to step 520, where the sub-cluster of loosely coordinated BSs may communicate their scheduling information to the sub-cluster of tightly coordinated BSs. The method 501 may proceed to step 530, where the sub-cluster of tightly coordinated BSs may perform joint scheduling. This joint scheduling may be executed sequentially (e.g., similar to the method depicted in FIG. 3), or via a collaborative negotiation. Next, the method 501 may proceed to step 540, where the sub-cluster of tightly coordinated BSs may communicate their scheduling decisions to the sub-cluster of loosely coordinated BSs. Subsequently, the method 501 may proceed to step 550, where the sub-cluster of loosely coordinated BSs may locally update their MCS assignments based on the scheduling information provided by the sub-cluster of tightly coordinated BSs. Next, the method may proceed to step 560, where a network component may determine whether a stop condition has been reached. If a stop condition has not been reached, then the steps 520-550 may be repeated. If a stop condition has been reached, then the method 501 may proceed to step 570, where the BSs (tightly coordinated, loosely coordinated, or otherwise) may broadcast the scheduling assignments to the UEs. Table 3 illustrates an example of the manner in which scheduling decisions evolve in a non-homogenous network during the coordinated scheduling outlined in the method 501.

TABLE 3

| | Tightly Coordinated BSs | | | Loosely Coordinated BSs | | | |
|---|---|---|---|---|---|---|---|
| Type | BS 420 | BS 430 | BS 440 | BS 460 | BS 470 | BS 480 | BS 490 |
| LS1 | | | | $UE_1(MCS_1)$ | $UE_2(MCS_2)$ | $UE_3(MCS_2)$ | $UE_4(MCS_1)$ |
| JS1 | $UE_5(MCS_2)$ | $UE_6(MCS_2)$ | $UE_7(MCS_3)$ | | | | |
| LS2 | | | | $UE_1(MCS_2)$ | $UE_2(MCS_3)$ | $UE_3(MCS_3)$ | $UE_4(MCS_3)$ |
| JS2 | $UE_8(MCS_2)$ | $UE_9(MCS_2)$ | $UE_{10}(MCS_3)$ | | | | |
| ... | ... | ... | ... | ... | ... | ... | ... |

As shown, a first round of local scheduling is performed by the loosely coordinated BSs. Next, a first round of joint scheduling is performed by the tightly coordinated BSs. This round of joint scheduling may be executed sequentially (e.g., as described in FIG. 3), via a collaborative negotiation amongst the tightly coordinated BS, or via a centralized computation by a centralized controller. Next, a second round of local scheduling is performed by the loosely coordinated BSs. Notably, during the second round of local scheduling, the UE assignments remain static while the MCS assignments are updated dynamically. Thereafter, a second round of joint scheduling may occur amongst the tightly coordinated BS, where MCS/UE assignments of the tightly coordinated BSs may be updated based on the new MCS assignments of the loosely coordinated BSs.

Figure 5B:
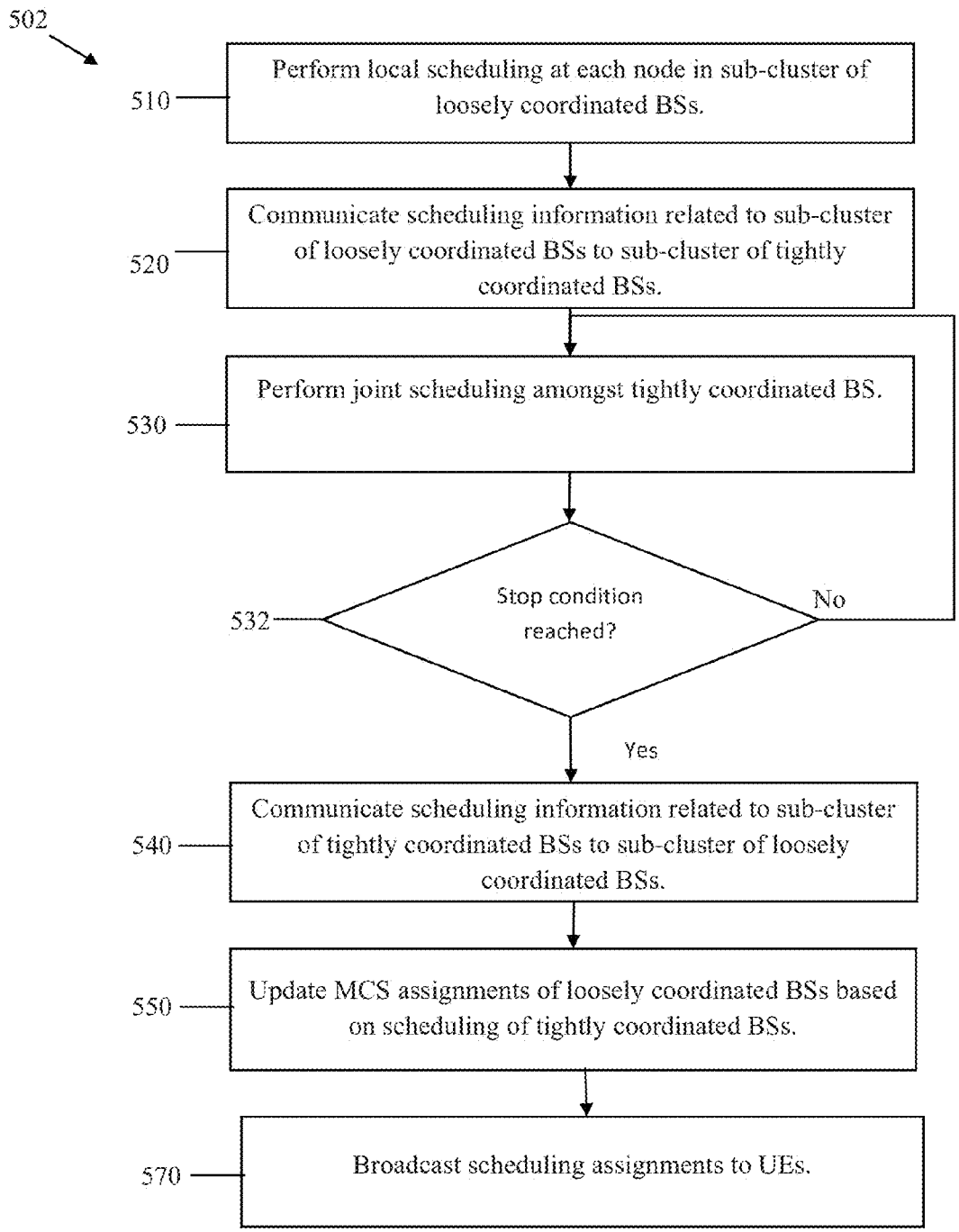
FIG. 5(b) illustrates another embodiment of a method for coordinated scheduling in a cluster of BSs having varying degrees of coordination.

FIG. 5(b) illustrates an embodiment of a method 502 for performing coordinated scheduling in a cluster that includes tightly coordinated BSs and loosely coordinated BSs. The method 502 may be similar to the method 501, except that the method 502 includes multiple iterations of joint scheduling prior to updating the MCS assignments of loosely coordinated BSs. Specifically, the method 502 includes the step 510 of performing local scheduling at each node in sub-cluster of loosely coordinated BSs, and the step 520 of communicating scheduling information of the sub-cluster of loosely coordinated BSs to the sub-cluster of tightly coordinated BSs. Thereafter, the method 502 proceeds to steps 530-532, where multiple iterations of joint scheduling may be performed amongst the tightly coordinated BSs until a stop condition is reached. Notably, each round of joint scheduling may be executed sequentially (e.g., as described in FIG. 3), via a collaborative negotiation amongst the tightly coordinated BS, or via a centralized computation by a centralized controller. Upon reaching the stop condition, the method 502 may include the step 540 of communicating scheduling information of the sub-cluster of tightly coordinated BSs to the sub-cluster of loosely coordinated BSs, the step 550 of updating MCS assignments of loosely coordinated BSs, and the step 570 of broadcasting scheduling assignments to the UEs. Table 4 illustrates an example of the manner in which scheduling decisions evolve in a non-homogenous network during the coordinated scheduling outlined in the method 502.

TABLE 4

| | Tightly Coordinated BSs | | | Loosely Coordinated BSs | | | |
|---|---|---|---|---|---|---|---|
| Type | BS 420 | BS 430 | BS 440 | BS 460 | BS 470 | BS 480 | BS 490 |
| LS1 | | | | $UE_1(MCS_1)$ | $UE_2(MCS_2)$ | $UE_3(MCS_2)$ | $UE_4(MCS_1)$ |
| JS1 | $UE_5(MCS_2)$ | $UE_6(MCS_2)$ | $UE_7(MCS_3)$ | | | | |
| JS2 | $UE_8(MCS_2)$ | $UE_9(MCS_2)$ | $UE_{10}(MCS_3)$ | | | | |
| ... | ... | ... | ... | | | | |
| JSN | $UE_{11}(MCS_4)$ | $UE_{12}(MCS_5)$ | $UE_{13}(MCS_6)$ | | | | |
| LS2 | | | | $UE_1(MCS_2)$ | $UE_2(MCS_3)$ | $UE_3(MCS_3)$ | $UE_4(MCS_3)$ |

Figure 5C:
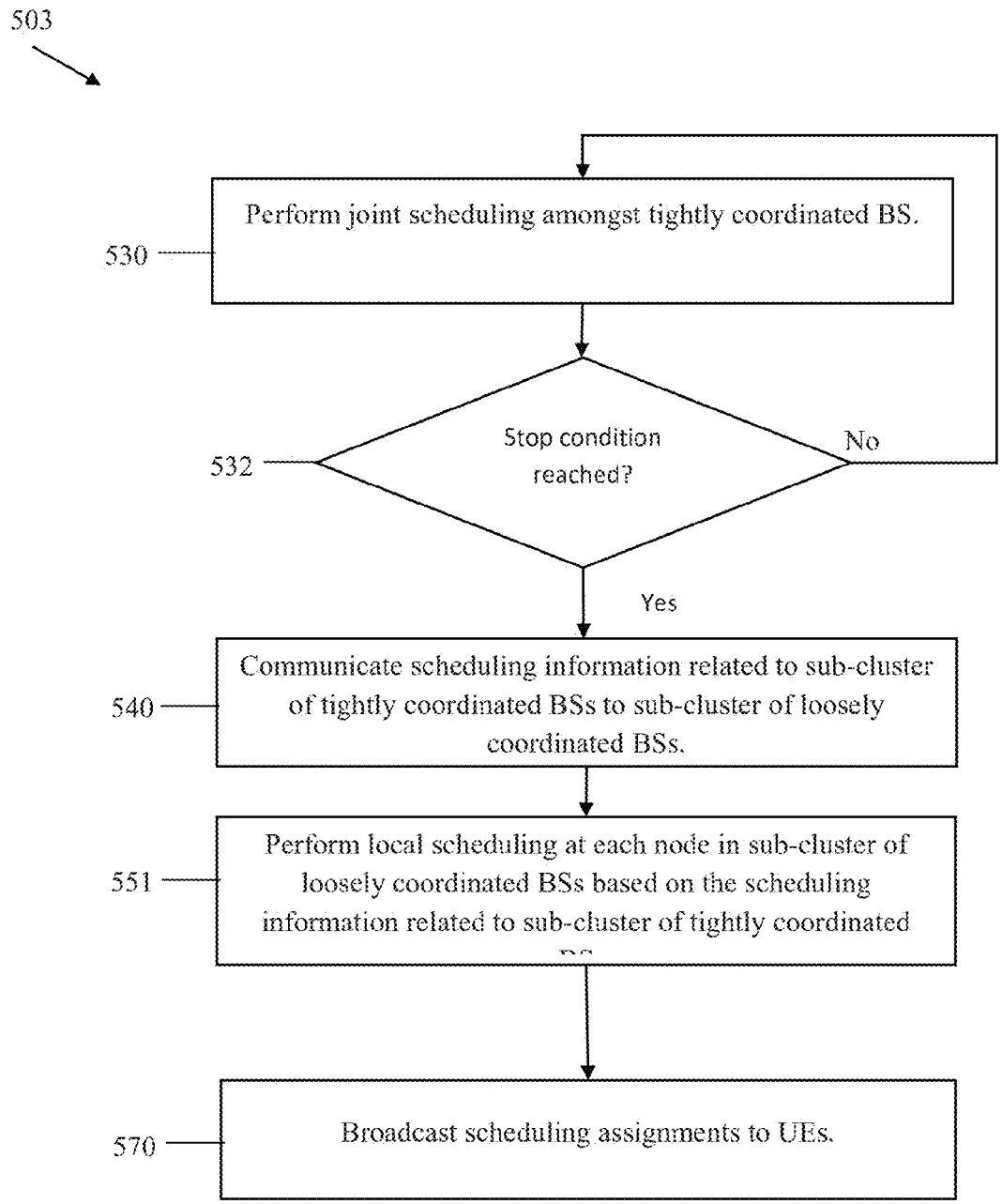
FIG. 5(c) illustrates yet another embodiment of a method for coordinated scheduling in a cluster of BSs having varying degrees of coordination.

FIG. 5(c) illustrates an embodiment of a method 503 for performing coordinated scheduling in a cluster that includes tightly coordinated BSs and loosely coordinated BSs. The method 503 may be similar to the method 502, except that the method 503 may perform one or more iterations of joint scheduling amongst the tightly coordinated BSs prior to performing local scheduling at the loosely coordinated BSs. Specifically, the method 503 begins at steps 530-532, where multiple iterations of joint scheduling may be performed amongst the tightly coordinated BSs (e.g., as described in FIG. 3) until a stop condition is reached. Notably, each round of joint scheduling may be executed sequentially (e.g., as described in FIG. 3), via a collaborative negotiation amongst the tightly coordinated BS, or via a centralized computation by a centralized controller. Upon reaching the stop condition, the method 503 may proceed to the step 540, where the scheduling information of the sub-cluster of tightly coordinated BSs is communicated to the sub-cluster of loosely coordinated BSs. Thereafter, the method 503 may proceed to the step 551, where local scheduling may be performed at each node in the sub-cluster of loosely coordinated BSs based on the scheduling information related to the sub-cluster of tightly coordinated BSs. Notably, the method 503 allows the sub-cluster of loosely coordinated BSs to make UE scheduling decisions in light of (i.e., with the knowledge of) scheduling decisions made by the sub-cluster of tightly coordinated BSs, which may (in some implementations) provide advantages over the methods 501-502. Thereafter, the method 503 may proceed to step 570, where scheduling assignments may be broadcast to the UEs. Table 5 illustrates an example of the manner in which scheduling decisions evolve in a non-homogenous network during the coordinated scheduling outlined in the method 503.

set) and a given number of resource blocks (B) are available for scheduling, then the complexity of the signal-to-noise (SNR) calculation is on an order identified by the following formula: $O(T*M*B*\Sigma_{m=1}^{M} N_m)$, where $N_m$ is the number of UEs served by $BS_m$, and T is the number of iterations.

Hence, the complexity savings ($C_s$) can be identified according to the following $$\text{formula: } C_s = \left(1 - \frac{\tilde{M}\sum_{m=1}^{\tilde{M}} N_m}{M\sum_{m=1}^{M} N_m}\right).$$

If the number of UEs for all of the BSs are the same, then the complexity savings ($C_s$) can be identified according to the following formula:

$$\text{formula: } C_s = \left(1 - \frac{\tilde{M}\sum_{m=1}^{\tilde{M}} N_m}{M\sum_{m=1}^{M} N_m}\right) = \left(1 - \left(\frac{\tilde{M}}{M}\right)^2\right).$$

For example, in a HetNet having three pico-BSs per sector and an equal number of UEs per cell (e.g., M=12 and M=3 for JSS and JH-a), the complexity reduction may be as high as 94 percent.

Figure 6:
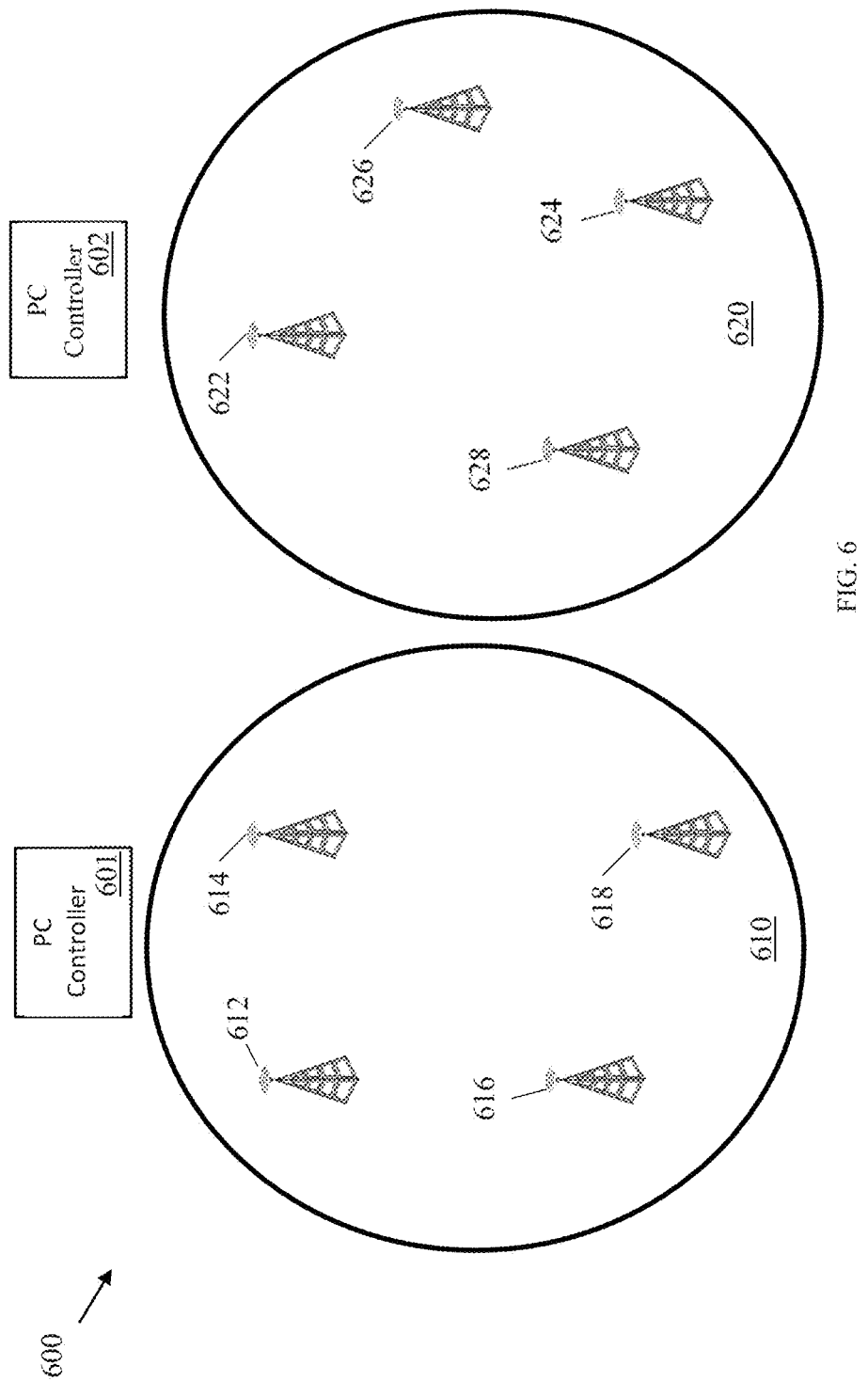
FIG. 6 illustrates a wireless network architecture comprising multiple clusters of BSs.

In some implementations, ICI between neighboring clusters may adversely affect throughput and/or coverage in a network. FIG. 6 illustrates a wireless network 600 comprising a first cluster of BSs 610 and a second cluster of BSs 620. The first cluster of BSs 610 includes a plurality of BSs 612-618, and the second cluster of BSs 620 includes a plurality of BSs 622-628. The clusters of BSs 610-620 may comprise a centralized, distributed, or hybrid architecture. For instance, in a centralized architecture, the PC controller 601 may be

TABLE 5

| | Tightly Coordinated BSs | | | Loosely Coordinated BSs | | | |
|---|---|---|---|---|---|---|---|
| Type | BS 420 | BS 430 | BS 440 | BS 460 | BS 470 | BS 480 | BS 490 |
| JS1 | $UE_5(MCS_2)$ | $UE_6(MCS_2)$ | $UE_7(MCS_3)$ | | | | |
| JS2 | $UE_8(MCS_2)$ | $UE_9(MCS_2)$ | $UE_{10}(MCS_3)$ | | | | |
| ... | ... | ... | ... | | | | |
| JSN | $UE_{11}(MCS_4)$ | $UE_{12}(MCS_5)$ | $UE_{13}(MCS_6)$ | | | | |
| LS1 | | | | $UE_1(MCS_2)$ | $UE_2(MCS_3)$ | $UE_3(MCS_3)$ | $UE_4(MCS_3)$ |

Aspects of this disclosure may decrease the complexity of joint scheduling. For instance, if it is assumed that a given number of BSs (M) are grouped in a joint scheduling set (JS responsible for scheduling/PC for the first cluster of BSs 610, while the PC controller 602 may be responsible for scheduling/PC for the second cluster of BSs 620. In a distributed architecture, scheduling/PC may be handled locally by the bases stations 612-618 and/or 622-628. In a hybrid architecture, some tasks (e.g., power control) may be handled by the PC controllers 601-602, while other tasks (e.g., scheduling) may be handled locally by the bases stations 612-618 and/or 622-628.

Interference from uplink transmissions to one or more of the BSs 612-618 may produce ICI in the cluster 620. To mitigate ICI in the cluster 620, network devices (e.g., BS s/PC controllers, etc.) in the cluster 610 may include an out-of-cluster utility component in the sum utility algorithm when performing joint scheduling.

Figure 7:
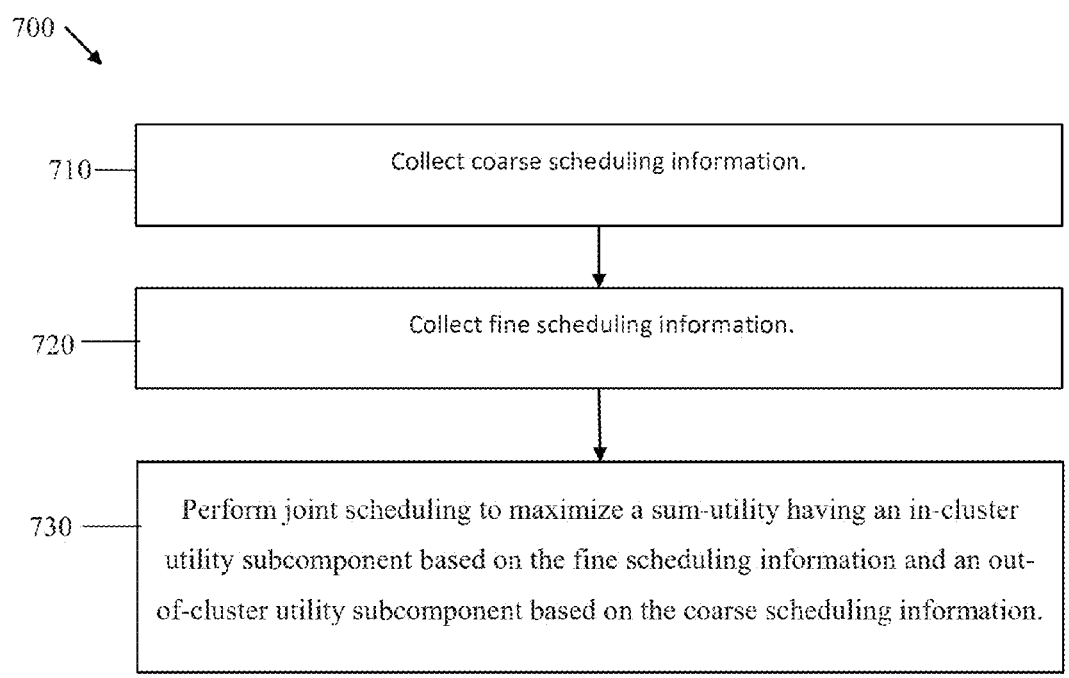
FIG. 7 illustrates an embodiment of a method for joint scheduling to maximize a sum utility having an out-of-cluster utility component.

FIG. 7 illustrates a flow chart of an embodiment of a method 700 for performing joint scheduling that mitigates inter-cell-interference levels of an external cluster. The method 700 begins at step 710, where a communications device (e.g., internal BS, central controller, etc.) may collect coarse scheduling information relating to an external cluster. Coarse scheduling information may include any information that allows a communications device (e.g., internal BS, central controller, etc.) in an instance cell/cluster to estimate or compute an out-of-cluster utility component for one or more external cells/clusters. In some embodiments, the coarse scheduling information (discussed in greater detail below) may include sub-gradient/interference-pricing information, and may be communicated to the cluster by cooperative external BSs. In other embodiments, the coarse scheduling information may include a utility-interference function and interference logs (e.g., UE logs) corresponding to uncooperative external BSs, and may be communicated by a network administrator.

Next the method 700 may proceed to step 720, where the communications device (e.g., BS, central controller, etc.) may collect fine scheduling information. Fine scheduling information may include any information that allows a communications device (e.g., internal BS, central controller, etc.) in an instant cell/cluster to estimate or compute an in-cluster utility component for that instant cell/cluster. For instance, the fine scheduling information may include scheduled UEs and/or MCS assignments made by (or proposed by) neighboring internal BSs within the instant cluster. Subsequently, the method 700 may proceed to step 730, where the communications device (e.g., BS, central controller, etc.) may perform joint scheduling to maximize a sum-utility. In embodiments, the sum-utility may include an in-cluster utility component that is computed based on the fine scheduling information, as well as an out-of-cluster utility component that is computed based on the coarse scheduling information.

The sum-utility algorithms used for the out-of-cluster utility component may depend on the level of cooperation between in-cluster BSs and external BSs. Specifically, BSs within separate clusters may have varying degrees of coordination depending on, for instance, whether they share the same manufacturer. Generally speaking, BSs in different clusters are considered cooperative when they are capable of communicating with one another, while BSs in different clusters are considered uncooperative when they are not-capable of communicating with one another. For instance, BSs 618 and 628 may be cooperative if they can communicate (e.g, exchange interference pricing information) using a common control protocol, or uncooperative when they cannot communicate using a common control protocol.

When external BSs are cooperative, an instant cluster (or component therein) may compute the out-of-cluster utility component based on the following formula:

$$U_{coop} = \sum_{k_i=1}^{K_i} x_{k_i} \left( \frac{S_{k_i} I'_i(x_{k_j})}{(I_i(x-k_i))^2} \right) U'_{k_i}(\gamma_{k_i}(x_{-k_i})),$$

where $x_{k_j}$ is a scheduling indicator of $UE(k_j)$, $S_{k_i}$ is a signal power of $UE(k_j)$, $I_i(x_{-k_i})$ is the interference-plus-noise at cell j, and $\gamma_{k_i}$ is the SNR of $UE(k_i)$.

When external BSs are uncooperative, an instant cluster (or component therein) may compute the out-of-cluster utility component based on the following formula:

$$U_{uncoop} = \sum_{k_i=1}^{K_i} w_{i,1} \log_2\left(1 + \frac{s_i}{1 + w_{i,2} * I(x_{k_j})}\right),$$

where $x_{k_j}$ is a scheduling indicator of $UE(k_j)$, I is the amount of interference generated by $UE(k_j)$, and $s_i$, $w_{i,1}$ and $w_{i,2}$ are fitted to approximate the average utility of the system.

In embodiments where the sum-utility includes both in-cluster and out-of-cluster utility components, an instant BS/PC-controller may need to compute utility components for up to four types of BSs, including: (i) tightly coordinated internal BSs; (ii) loosely coordinated internal BSs; (iii) cooperative external BSs; and (iv) uncooperative external BSs. Hence, the sum-utility component may be computed based on the following formula:

$$Q_{k_j} = x_{k_j} \Bigg\{ \sum_{j \in IBS_{tight}} u_{k_j}(x_{-k_j}) + \sum_{j \in IBS_{loose}} u_{k_j}(x_{-k_j}) -$$

$$\sum_{i \in EBS_{coop}} \sum_{k_i=1}^{K_i} x_{k_i}\left(\frac{S_{k_i} I'_i(x_{k_j})}{(I_i(x_{-k_i}))^2}\right) U'_{k_i}(\gamma_{k_i}(x_{-k_i})) +$$

$$\sum_{i \in EBS_{uncoop}} \sum_{k_i=1}^{K_i} w_{i,1} \log_2\left(1 + \frac{s_i}{1 + w_{i,2} * I(x_{k_j})}\right) \Bigg\}$$

where $\Sigma_{j \in IBS_{tight}} u_{k_j}(x_{-k_j})$ is a sub-component of the in-cluster utility corresponding to tightly coordinated BSs, $\Sigma_{j \in IBS_{loose}} u_{k_j}(x_{-k_j})$ is a sub-component of the in-cluster utility corresponding to loosely coordinated BSs, $$\sum_{i \in EBS_{coop}} \sum_{k_i=1}^{K_i} x_{k_i}\left(\frac{S_{k_i} I'_i(x_{k_j})}{(I_i(x_{-k_i}))^2}\right) U'_{k_i}(\gamma_{k_i}(x_{-k_i}))$$

is a sub-component of the out-of-cluster utility corresponding to cooperative BSs, and $$\sum_{i \in EBS_{uncoop}} \sum_{k_i=1}^{K_i} w_{i,1} \log_2\left(1 + \frac{s_i}{1 + w_{i,2} * I(x_{k_j})}\right)$$

is a sub-component of the out-of-cluster utility corresponding to uncooperative BSs.

Hence, the in-cluster utility component may include two sub-components corresponding to interferences observed by tightly coordinated internal BSs and loosely coordinated internal BSs (respectively), while the out-of-cluster utility component may include two sub-components corresponding to interferences observed by cooperative external BSs and uncooperative external BSs.

The step of performing joint scheduling to maximize sum-utility can be accomplished in a centralized fashion (e.g., by a centralized PC controller) or in a distributed fashion (e.g., by the internal BSs) by solving an argument for the maximum function (arg$_j$max), which may yield the optimal UE scheduling and MCS assignment(s) for the instant internal BS (s). When performed in a distributed fashion, joint scheduling may be performed via a collaborative negotiation (e.g., where the BSs coordinate with one another to simultaneously (or quasi-simultaneously) reach their respective scheduling decisions) or using an iterative/sequential approach (e.g., as described above in FIG. 3).

The following mathematical explanation describes how the utility functions were obtained. The following notations are used throughout this disclosure. J represents the number of BSs; $K_1$ represents the number of UEs in a BS$_j$; $k_j$ is an index of a UE in BS$_j$ (where $k_j=\{1, 2, \ldots K_j\}$; "x" represents the scheduling decision for all of the J BSs (where $x=[\vec{x}_1, \ldots, \vec{x}_J]$ with $$\vec{x}_1 = [x_{k_j}]_{|k_j=\{1,2,\ldots,K_j\}}; x_{k_j}$$

represents an indicator function (where 1 means UE($k_j$) is scheduled, and 0 means UE($k_j$) is not scheduled); $U_{k_j}(x)$ represents a utility of UE($k_j$) in BS$_j$ given the scheduling decision x; and $I_{ik_j}$ represents the interference caused in BSi by UE($k_j$).

The optimization problem can be formulated as follows:

$$\max_x\{\Sigma_{j=1}^J \Sigma_{k_j=1}^{K_j} x_{k_j} U_{k_j}(x_{-k_j})\},$$

where $\Sigma_{k_j=1}^{K_j} x_{k_j} \le 1, \forall j$

At Karush-Kuhn-Tucker (KKT), the JS scheduling criterion can be deduced as follows:

$$k_j^* = \arg_{k_j}\max\left\{\sum_{j\in BS\ cluster} U_{k_j}(x_{-k_j}) - \sum_{i\notin BS\ cluster}\sum_{k_i=1}^{K_i} x_{k_i}\left(-\frac{\partial U_{k_i}(x_{-k_i})}{\partial x_{k_j}}\right)\right\}$$

where $x_{k_j^*}$ is set to one.

In general, the utility of a BS is a function of signal to noise ratio (SNR), which is may be expressed as follows: $U_{k_j}(x_{-k_j}) = U_{k_j}(\gamma_{k_j}(x_{-k_j}))$, where SNR of UE($k_j$) is denoted as $$\gamma_{k_j}(x_{-k_j}), \text{ i.e., } \gamma_{k_j}(x_{-k_j}) = \frac{S_{k_j}}{I_j(x_{-k_j})}$$

the signal power of UE($k_j$) is denoted as $S_{k_j}$, and the interference-plus-noise at cell j is denoted as $I_j(x_{-k_j})$. As such, the following equation may be derived:

$$\frac{\partial U_{k_j}(\gamma_{k_j}(x_{-k_j}))}{\partial x_{k_j}} =$$

-continued $$\left(\frac{\partial U_{k_i}(\gamma_{k_i}(x_{-k_i}))}{\partial \gamma_{k_i}(x_{-k_i})}\right)\left(\frac{\partial \gamma_{k_i}(x_{-k_i})}{\partial x_{k_j}}\right) = U'_{k_i}(\gamma_{k_i}(x_{-k_i}))\left(-\frac{S_{k_i}I'_i(x_{k_j})}{(I_i(x_{-k_i}))^2}\right)$$

where $$I'_i(x_{k_j}) = \frac{\partial I_i(x_{-k_i})}{\partial x_{k_j}}.$$

So, at KKT, the JS scheduling criterion can be deduced as follows $$k_j^* = \arg_{k_j}\max$$

$$\left\{\sum_{j\in BS\ cluster} U_{k_j}(x_{-k_j}) - \sum_{i\notin BS\ cluster}\sum_{k_i=1}^{K_i} x_{k_i}\left(\frac{S_{k_i}I'_i(x_{k_j})}{(I_i(x_{-k_i}))^2}\right)U'_{k_i}(\gamma_{k_i}(x_{-k_i}))\right\}$$

In practice, the following information may be used to compute the sub-gradient:

The marginal change in interference ($I'_i(x_{k_j})$) experienced by cell-i if UE($k_j$) is scheduled in cell-j. This term is to be computed and provided locally at cell-j.

Interference-plus-noise ($I_i(x_{-k_i})$) at cell-i can be approximated by the average IoT, which may be computed and provided remotely at cell-i.

The signal power of UE($k_i$) together with the scheduling indicator $x_{k_i}$, ($x_{k_i}S_{k_i}$), can be approximated by an "average UE". This term may be computed (or approximated) and provided remotely at cell-i.

The marginal change in the utility ($U'_{k_i}(\gamma_{k_i}(x_{-k_i}))$) of UE($k_i$) per unit change in SNR $\gamma_{k_i}(x_{-k_i})$. This term is computed and provided remotely at cell-i.

The utilities of uncooperative BSs may be approximated based on the UE logs from an operator and curve fitting techniques. For instance, one example is as follows:

$$\sum_{k_j=1}^{K_j} x_{k_j}U_{k_j}(x_{-k_j}) \approx w_{j,1}\log_2\left(1 + \frac{s_j}{1 + w_{j,2}*I(x_{k_j})}\right)$$

As discussed above, BSs in the same cluster may have different levels of coordination. For BSs with tight coordination, scheduled UEs and MCS assignments may be changed dynamically (e.g., during joint scheduling). For BSs with loose coordination, MCS assignments may be changed dynamically (i.e., updated in subsequent iterations), but UE scheduling may be performed statically (e.g., not updated in subsequent iterations). The inability for loosely coordinated BSs to update scheduled UEs may be attributable (at least in part) to delay constraints.

Thus, the scheduling priority and/or MCS adaptation of UE($k_j$) in cell j can be given as follows:

$$Q_{k_j} = x_{k_j}\left\{\sum_{j\in BS\ cluster\ with\ tight\ coordination} U_{k_j}(x_{-k_j}) + \sum_{j\in BS\ cluster\ with\ loose\ coordination} U_{k_j}(x_{-k_j}) - \right.$$

$$\sum_{i \notin BS\ cluster\ with\ info\ exchange} \sum_{k_i=1}^{K_i} x_{k_i} \left( \frac{S_{k_i} I'_i(x_{k_j})}{(I_i(x_{-k_i}))^2} \right) U'_{k_i}(\gamma_{k_i}(x_{-k_i})) +$$

$$\sum_{i \notin BS\ cluster\ w/o\ info\ exchange} w_{i,1} \log_2 \left( 1 + \frac{s_i}{1 + w_{i,2} * I(x_{k_j})} \right) \Bigg\}$$

In one example where the sum-utility maximization is to achieve proportional fairness, it may be assumed that all BSs exchange sub-gradient information, that $$T_{k_j k_j} = -\frac{\partial U_{k_i}(x_{-k_i})}{\partial x_{k_j}},$$

and that $$U_{k_i}(x_{-k_i}) = \frac{r_{k_i}}{\bar{r}_{k_i}},$$

where $\bar{r}_{k_i}$ is the average throughput of UE($k_i$) over a certain window, and that $$r_{k_i} = \log \left( \frac{s_{k_i}}{I_i(x_{-k_i})} \right).$$

As such, $$T_{k_j k_j} = \frac{1}{\bar{r}_{k_i}} \frac{I'_i(x_{k_j})}{I_i(x_{-k_i})}.$$

Hence, the scheduling priority calculation for UE($k_j$) can be given as follows:

$$Q_{k_j} = x_{k_j} \left\{ \sum_{j \in BS\ cluster} U_{k_j}(x_{-k_j}) - \sum_{i \notin BS\ cluster} \sum_{k_i=1}^{K_i} x_{k_i} T_{k_j k_j} \right\}$$

$$= \left\{ \sum_{j \in BS\ cluster} U_{k_j}(x_{-k_j}) - \sum_{i \notin BS\ cluster} \sum_{k_i=1}^{K_i} \frac{x_{k_i}}{\bar{r}_{k_i}} \frac{I'_i(x_{k_j})}{I_i(x_{-k_i})} \right\}$$

However, $BS_j$ may not always know which UE is scheduled in $BS_i$ (since they belong to different clusters). In such instances, the sub-gradient $T_{k_j k_j}$ may be estimated as follows:

$$Q_{k_j} \approx x_{k_j} \left\{ \sum_{j \in BS\ cluster} \frac{r_{k_j}}{\bar{r}_{k_j}} - \sum_{i \notin BS\ cluster} \frac{1}{\bar{r}_{i_{eff}}} \frac{I'_i(x_{k_j})}{\bar{I}_i} \right\};$$

where $\bar{I}_i$ is the scaled average IoT of $BS_i$, $$\bar{r}_{i_{eff}} = \frac{1}{\sum_{k_i=1}^{K_i} \frac{P(x_{k_i}=1)}{\bar{r}_{k_i}}},$$

with $P(x_{k_i}=1)$ being the probability that UE $k_i$ is scheduled at $BS_i$.

Therefore, the total sub-gradients at $$BS_i \left( \sum_{k_i=1}^{K_i} x_{k_i} \left( -\frac{\partial U_{k_i}(x_{-k_i})}{\partial x_{k_j}} \right) \right)$$

can be approximated by:

$$\frac{1}{\bar{r}_{i_{eff}}} \frac{I'_i(x_{k_j})}{\bar{I}_i}.$$

In case of proportional fairness, the following three terms may be used to compute the sub-gradient: $\bar{r}_{i_{eff}}$; $\bar{I}_i$; and $I'_i(x_{k_j})$.

Therefore, cell-i can broadcast the values of $\bar{r}_{i_{eff}}, \bar{I}_i$ via overload indicator (OI) messages and/or High Interference Indicator (HII) messages periodically. Further, the $BS_j$ may then compute $I'_t(x_{k_j})$, E.G., $I'_i(x_{k_j})=p_{k_j}g_{ik_j}$, and hence $$\frac{\partial U_{k_i}(x_{-k_i})}{\partial x_{k_j}}$$

locally every TTI, where $p_{k_j}$ is the transmit power of UE($k_j$) and $g_{ik_j}$ is the channel gain from UE($k_j$) to $BS_i$. Since $\bar{r}_{i_{eff}} \bar{I}_i$ represents the average statistics (which are not expected to vary substantially from TTI to TTI), the periodic OI/HII message exchange should be sufficient for good performance while keeping signaling complexity low.

When information from uncooperative external BSs is not available, the network provider may keep track of the relationship of the utility and the interference experienced by each of those uncooperative BSs and periodically forward this function (or a couple of sample points corresponding to said function) to a cooperative BS. In implementations where the scheduled UEs are static (i.e., cannot be changed after initial scheduling), the equation for priority calculation may be used to select a more optimal MCS after the OI/HII message exchange.

Figure 8:
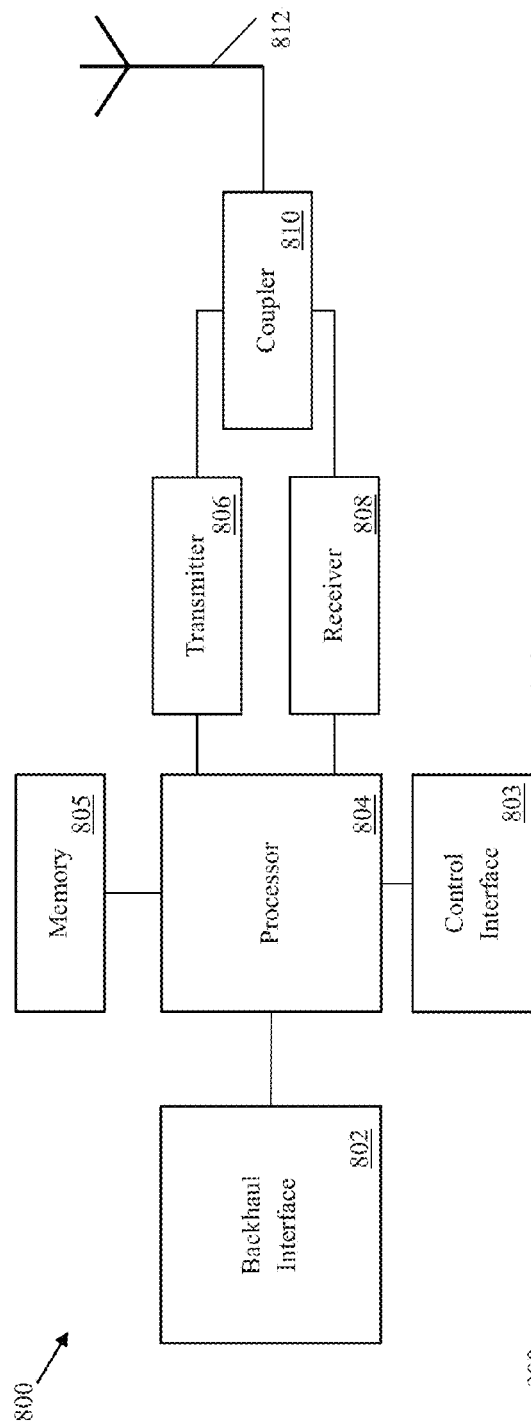
FIG. 8 illustrates a block diagram of an embodiment base station.

FIG. 8 illustrates a block diagram of an embodiment BS 800. The BS 800 may include a backhaul network interface 802, a control interface 803, a processor 804, a memory 805, a transmitter 806, a receiver 808, a coupler 810, and an antenna 812, which may be arranged as shown in FIG. 8. The backhaul network interface 802 may be any component or collection of components that allows the BS 800 to engage in network communications with other components connected to a backhaul network, such as internal BSs (e.g., macro/pico BSs in the same cluster as the BS 800), PC controllers, and external BSs (e.g., BSs in the other clusters). The control interface 803 may be any interface that allows the BS 800 to communicate with a network operator. The processor 804 may be any component capable of performing computations and/or other processing related tasks, and the memory 805 may be any component capable of storing programming and/or instructions for the processor. The transmitter 806 may be any component capable of transmitting a signal, while the receiver 808 may be any component capable of receiving a signal. The coupler 810 may be any component capable of isolating a transmission signal from a reception signal, such as a duplexer. The antenna 812 may be any component capable of emitting and/or receiving a wireless signal. In an embodiment, the BS 800 may be configured to operate in an LTE network using an OFDMA downlink channel divided into multiple subbands or subcarriers and using SC-FDMA in the uplink. In alternative embodiments, the BS 800 may be configured to operate in other systems and/or network types using different uplink/downlink transmission schemes, such as 1XEV-DO, IEEE 802.11, IEEE 802.15, IEEE 802.16, etc.

Figure 9:
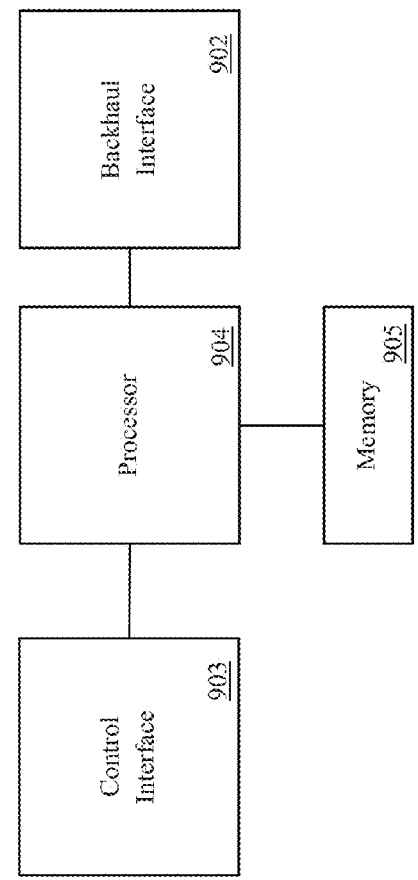
FIG. 9 illustrates a block diagram of an embodiment PC controller.

FIG. 9 illustrates a block diagram of an embodiment PC controller 900. The PC controller 900 may include a backhaul interface 902, a PC controller interface 903, a processor 904, and a memory 905, which may be arranged as shown in FIG. 9. The backhaul interface 902 may be any component or collection of components that allows the PC controller 900 to engage in network communications with other components connected to a backhaul network, such as internal BSs (e.g., macro/pico BSs in the cluster managed by the PC controller 900), other PC controllers, and external BSs (e.g., BSs in the other clusters). The control interface 903 may be any interface that allows the PC controller 900 to communicate with a network operator. The processor 904 may be any component capable of performing computations and/or other processing related tasks, and the memory 905 may be any component capable of storing programming and/or instructions for the processor.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing joint scheduling in an instant cluster of base stations (BSs) of a wireless network, the method comprising:
receiving, by a network component, coarse scheduling information pertaining to a plurality of external BSs; and
performing, by the network component, joint scheduling for at least a first one of a plurality of internal BSs included within the instant cluster of BSs such that a sum utility is maximized, wherein the sum utility includes an out-of-cluster utility component corresponding to an amount of estimated interference to be observed by the plurality of external BSs as a result of the joint scheduling, the plurality of external BSs being excluded from the instant cluster of BSs, wherein the network component does not participate in scheduling for any of the plurality of external BSs, and wherein the out-of-cluster utility component is computed in accordance with the coarse scheduling information.

2. The method of claim 1 further comprising:
receiving fine scheduling information from a second one of the plurality of internal BSs, wherein the sum utility further includes an in-cluster utility component corresponding to an amount of estimated interference to be observed by at least the second internal BS, and wherein the in-cluster utility component is computed in accordance with the fine scheduling information.

3. The method of claim 2, wherein the fine scheduling information specifies user equipment (UE) scheduling and modulation coding scheme (MCS) assignments performed by the second internal BS, and
wherein the coarse scheduling information includes sub-gradient information specifying interference pricing of one or more of the plurality of external BSs.

4. The method of claim 3, wherein the coarse scheduling information does not specify UE scheduling and MCS assignments performed by any of the plurality of external BSs.

5. The method of claim 1, wherein a first one of the plurality of external BSs is cooperative such that the coarse scheduling information includes sub-gradient information specifying an interference pricing value for the first external BS.

6. The method of claim 5, wherein the out-of-cluster utility component includes a first sub-component corresponding to an amount of estimated interference to be observed by the first external BS, the first sub-component being computed according to the following formula:

$$U_{coop} = \sum_{k_i=1}^{K_i} x_{k_i} \left( \frac{s_{k_i} I'_i(x_{k_j})}{(I_i(x_{-k_i}))^2} \right) U'_{k_i}(\gamma_{k_i}(x_{-k_i})),$$

where $x_{k_j}$ is a scheduling indicator of a given UE (UE($k_j$)), $S_{k_i}$ is a signal power of the UE($k_i$), $I_i(x_{-k_i})$ is an interference-plus-noise estimate at a cell-i, and $\gamma_{k_i}$ is a signal-to-noise (SNR) of the UE($k_i$).

7. The method of claim 1, wherein a second one of the plurality of external BSs is uncooperative such that the coarse scheduling information does not include sub-gradient information for the second external BS.

8. The method of claim 7, wherein the coarse scheduling information includes one or more user equipment (UE) logs corresponding to the second external BS and information pertaining to a utility-interference function for the second external BS, the utility-interference function for estimating levels of interference to be observed by the second external BS in accordance with the one or more UE logs, and
wherein the out-of-cluster utility component includes a second sub-component corresponding to an amount of estimated interference to be observed by at least the second external BS, the second sub-component being computed according to the following formula:

$$U_{uncoop} = \sum_{k_j=1}^{K_i} w_{i,1} \log_2 \left( 1 + \frac{s_i}{1 + w_{i,2} * I(x_{k_j})} \right),$$

where $x_{k_j}$ is a scheduling indicator of a given UE (UE($k_j$)), $I(x_{k_j})$ is an amount of interference generated by UE($k_j$), and $s_i$, $w_{i,1}$ and $w_{i,2}$ are fitted to approximate an average utility of the wireless network.

9. A network component corresponding to an instant cluster of base stations (BSs) in a wireless network; the network component comprising:
a processor; and
a non-transitory computer readable storage medium storing programming for execution by the processor, the programming including instructions to:
receive coarse scheduling information pertaining to a plurality of external BSs that are not included within the instant cluster of BSs; and
perform scheduling for at least one internal BS in the instant cluster of BSs such that a sum utility is maximized, wherein the sum utility includes an out-of-cluster cluster utility component corresponding to an amount of estimated interference to be observed by the plurality of external BSs as a result of the scheduling, and wherein the sum utility is computed in accordance with the coarse scheduling information, and wherein the network component does not participate in scheduling for any of the plurality of external BSs.

10. The network component of claim 9, wherein the programming further includes instructions to receive fine scheduling information pertaining to a plurality of internal BSs included within the instant cluster of BSs, wherein the sum utility further includes an in-cluster utility component that is computed in accordance with the fine scheduling information, and
wherein the in-cluster utility component corresponds to an amount of estimated interference to be observed by one or more of the plurality of internal BSs as a result of the scheduling.

11. The network component of claim 10, wherein the fine scheduling information specifies user equipment (UE) scheduling and modulation coding scheme (MCS) assignments performed by at least some of the plurality of internal BSs, and
wherein the coarse scheduling information includes sub-gradient information specifying interference pricing of at least some of the plurality of external BSs.

12. The network component of claim 11, wherein the coarse scheduling information does not include UE scheduling and MCS assignments performed by any of the plurality of external BSs.

13. The network component of claim 9, wherein a first one of the plurality of external BSs is cooperative such that the coarse scheduling information includes sub-gradient information specifying an interference pricing value for the first external BS.

14. The network component of claim 13, wherein the out-of-cluster utility component includes a first sub-component corresponding to an amount of estimated interference to be observed by the first external BS, the first sub-component being computed according to the following formula:

$$U_{coop} = \sum_{k_i=1}^{K_i} x_{k_i} \left( \frac{s_{k_i} I'_i(x_{k_j})}{(I_i(x_{-k_i}))^2} \right) U'_{k_i}(\gamma_{k_i}(x_{-k_i})),$$

where $x_{k_j}$ is a scheduling indicator of a given UE (UE($k_j$)), $S_{k_j}$ is a signal power of the UE($k_j$), $I_j(x_{-k_j})$ is an interference-plus-noise estimate at a cell j, and $\gamma_{k_j}$ is a signal-to-noise ratio (SNR) of the UE($k_j$).

15. The network component of claim 9, wherein a first one of the plurality of external BSs is uncooperative such that the coarse scheduling information does not include sub-gradient information for the first external BS.

16. The network component of claim 15, wherein the coarse scheduling information includes one or more user equipment (UE) logs corresponding to the second external BS and information pertaining to a utility-interference function for the second external BS, the utility-interference function for estimating levels of interference to be observed by the second external BS in accordance with the one or more UE logs, and wherein the out-of-cluster utility component includes a second sub-component corresponding to an amount of estimated interference to be observed by at least the second external BS, the second sub-component being computed according to the following formula:

$$U_{uncoop} = \sum_{k_i=1}^{K_i} w_{i,1} \log_2\left(1 + \frac{s_i}{1 + w_{i,2} * I(x_{k_j})}\right),$$

where $x_{k_j}$ is a scheduling indicator of a given UE (UE($k_j$)), $I(x_{k_j})$ is an amount of interference generated by UE($k_j$), and $s_i$, $w_{i,1}$ and $w_{i,2}$ are fitted to approximate an average utility of the wireless network.

17. A base station (BS) in a cluster of BSs in a wireless network, the BS comprising:
a processor; and
a non-transitory computer readable storage medium storing programming for execution by the processor, the programming including instructions to:
receive scheduling information specifying user equipment (UE) scheduling and modulation coding scheme (MCS) assignments of a first one of a plurality of neighboring BS in the cluster of BSs; and
perform joint scheduling to maximize a sum-utility, the sum-utility including a first sub-component corresponding to the first neighboring BS and a second sub-component corresponding to a second one of the plurality of neighboring BSs,
wherein the first sub-component is computed according to the UE scheduling and MCS assignments of the first neighboring BS, and
wherein the second sub-component is approximated without any knowledge of UE scheduling and MCS assignments pertaining to the second neighboring BS.

18. The BS of claim 17, wherein the instructions to perform joint scheduling include instructions to approximate the second sub-component according to the following formula:

$$U_2 \approx w_1 \log_2\left(1 + \frac{s}{1 + w_2 * I}\right),$$

where I is the amount of interference generated by a given user, and s, $w_1$ and $w_2$ are fitted to approximate an average utility of the wireless network.

19. A base station (BS) in a cluster of BSs in a wireless network, the BS comprising:
a processor; and
a non-transitory computer readable storage medium storing programming for execution by the processor, the programming including instructions to:
receive scheduling information pertaining to a first resource block (RB), the scheduling information specifying that a first one of a plurality of neighboring BSs in the cluster of BSs has scheduled a first user equipment (UE) to perform an uplink transmission in a resource block (RB) using a first modulation coding scheme (MCS);

perform a first iteration of scheduling for the RB in accordance with the scheduling information;

receive updated scheduling information pertaining to the RB after performing the first iteration of scheduling, the updated scheduling information specifying that the first neighboring BS has re-scheduled a second UE to the RB, re-assigned a second MCS to the RB; or both; and perform a second iteration of scheduling for the RB in accordance with the updated scheduling information, the second iteration of scheduling modifying the first iteration of scheduling.

20. The BS of claim 19, wherein the instructions to perform the first iteration of scheduling includes instructions to schedule a third UE to the RB, and wherein the instructions to perform the second iteration of scheduling includes instructions to re-schedule a fourth UE to the RB.

21. The BS of claim 19, wherein the instructions to perform the first iteration of scheduling include instructions to statically schedule a third UE to the RB, and instructions to assign a third MCS to the RB, and wherein the instructions to perform the second iteration of scheduling include instructions to re-assign a fourth MCS to the RB without re-scheduling the third UE such that the first UE is scheduled to perform an uplink transmission in the RB using the second MCS.

22. The BS of claim 21, wherein the instructions to perform the first iteration of scheduling are configured such that re-scheduling a different UE to the RB is not possible after executing the instructions to statically schedule the third UE to the RB.

23. A pico base station (pico-BS) in a heterogeneous network (Het-Net), the pico-BS comprising:

a processor; and a non-transitory computer readable storage medium storing programming for execution by the processor, the programming including instructions to:

perform localized scheduling to schedule a first user equipment (UE) to perform an uplink transmission in a resource block (RB) using a first modulation coding scheme (MCS);

communicate localized scheduling information describing the localized scheduling to a macro base station (macro-BS) in the HetNet, thereby triggering the macro-BS to engage in joint scheduling with neighboring macro-BSs in the HetNet;

receive joint scheduling information describing the joint scheduling from the macro-BS; and responsive to receiving the joint scheduling information, update the localized scheduling in accordance with the joint scheduling information by re-assigning a second MCS to the RB without rescheduling the first UE.

24. A macro base station (macro-BS) in a heterogeneous network (Het-Net), the macro-BS comprising:

a processor; and a non-transitory computer readable storage medium storing programming for execution by the processor, the programming including instructions to:

receive a first scheduling information from a first one of a plurality of pico base stations (pico-BSs) in the HetNet, the first scheduling information specifying that the first pico-BS has scheduled a first user equipment (UE) to perform an uplink transmission in a resource block (RB) using a first modulation coding scheme (MCS);

perform joint scheduling with a plurality of neighboring macro-BSs under an assumption that the first pico-BS has scheduled the first UE to perform an uplink transmission in the RB using the first MCS; and communicate a second scheduling information describing the joint scheduling to the first pico-BS, thereby causing the first pico-BS to re-assign a second MCS to the RB without rescheduling the first UE.

* * * * *